Patented Nov. 4, 1924.

1,513,922

UNITED STATES PATENT OFFICE.

ARDON M. MITCHELL, OF CRESTWOOD, NEW YORK, ASSIGNOR OF ONE-HALF TO KATE M. WIDMER AND ONE-HALF TO HARRIET P. BAIN, BOTH OF NEW YORK, N. Y.

PLASTIC COMPOSITION AND PROCESS OF MAKING SAME.

No Drawing.   Application filed July 9, 1923.   Serial No. 650,513.

*To all whom it may concern:*

Be it known that I, ARDON M. MITCHELL, citizen of the United States, residing at Crestwood, in the county of Westchester and State of New York, have invented certain new and useful Improvements in Plastic Compositions and Processes of Making Same, of which the following is a specification.

This invention relates to certain new and useful improvements in a composition of matter and process of making the same, and it has for an object to simplify and expedite the manufacture of a composition especially adaptable for pipe coverings, blocks, plaster boards, insulation, and the like.

A further object resides in initiating a reaction which may continue through and subsequent to the molding of the product without exuding a portion of the binder element to the surface.

Another object is to provide a composition and a method of mixing the same whereupon the ingredients may be quickly molded into the product and then become more intimately united and bound together through internal reaction after removal from the mold.

The invention further resides in the features, steps and their combinations and arrangements as will be hereinafter described in detail and succinctly claimed.

In proceeding in accordance with the present invention, I take six parts of coal ashes and dampen the same with one part of water. To the dampened ashes is added one part of finely divided caustic soda and the whole thoroughly mixed. The mass is then immediately placed in a mold under pressure. The product can immediately be taken from the mold and placed on end to dry. The subsequent diffusion of the alkali throughout the mass enormously increases the reaction and crystallization without the subsequent breaking up of the crystalloidal formation that would take place in a fluid content. The heat evolved in the reaction between the water and the soda is conserved to react on the colloids of the ashes more effectively because of the concentration. The large crystalloids are unbroken and in consequence give greater strength to the product, and in the drying the efflorescence and exudations to the surface of the molded form from the center prevent an unequal distribution of the binder.

The heat and the reaction act instantly on the colloids in the ashes to make binder enough to maintain the form so that it can be taken from the mold and handled at once. The molded form taken from the mold continues to react until the reagent is satisfied.

The mass is firmly held intact by the binder. The caustic soda which forms the binder is of sufficient viscosity to hold the molded body intact while the continued reaction serves to harden the body without permitting the reagent to exosmose to the surface.

This method produces a very strong and light product which is admirably adapted for the manufacture of building blocks, plaster-boards, and pipe coverings, with insulating qualities equal to those of asbestos. The product can also be utilized in various other capacities, as for rendering all cellulose (such as grass straw, hemp, and paper) non-inflammable.

Time and labor is the essence of the improved method for where it is not desired to utilize a liquid binder, aggregates insoluble in water may expeditiously be united into one solid body. This method is applicable where a fluid binder is not desired to bind other aggregates and has also the advantage of not exuding a portion of the binder to the surface leaving an uneven distribution. The element of time saved is a desideratum by reason of there being less water to dry out and does not involve the use of tanks for boiling or digesting or concentrating the binder to adapt it to bind other aggregates.

What is claimed is:—

1. The method which consists in dampening six parts of coal ash with one part of water, thoroughly mixing with the dampened ashes one part of finely divided caustic soda, and then molding the mass under pressure.

2. A composition of matter composed of six parts of coal ashes, one part of water, and one part of caustic soda.

3. A heat insulating material which is produced in dampening six parts of coal ash with one part of water, thoroughly mixing with the dampened ashes one part of finely divided caustic soda, and then molding the mass under pressure.

In testimony whereof I affix my signature.

ARDON M. MITCHELL.